United States Patent [19]

Weigl et al.

[11] 4,085,766
[45] Apr. 25, 1978

[54] ADJUSTABLE GAS MIXING VALVE

[75] Inventors: James Weigl; Leo James Lichte, both of Riverside, Calif.

[73] Assignee: Bourns, Inc., Riverside, Calif.

[21] Appl. No.: 677,344

[22] Filed: Apr. 15, 1976

[51] Int. Cl.² .............................................. F16K 11/00
[52] U.S. Cl. ........................................ 137/88; 137/98; 137/637.2
[58] Field of Search .............. 137/88, 98, 100, 625.17, 137/637.2

[56] References Cited

U.S. PATENT DOCUMENTS

| 2,032,641 | 3/1936 | Thomas | 137/98 |
|---|---|---|---|
| 2,486,017 | 10/1949 | Furkert | 137/98 X |
| 3,233,987 | 2/1966 | Hepburn | 137/88 X |
| 3,416,570 | 12/1968 | Kervin | 137/625.17 |
| 3,675,683 | 7/1972 | Chapou | 137/625.17 X |
| 3,884,259 | 5/1975 | Hosmer et al. | 137/637.2 X |

FOREIGN PATENT DOCUMENTS 491,408  9/1938  United Kingdom ................ 137/88

Primary Examiner—William R. Cline

Attorney, Agent, or Firm—Paul H. Ware; William G. Becker

[57] ABSTRACT

A gas mixing valve including a hollow piston slidably lodged within a sleeve. Openings are formed in the piston wall in adjustable alignment with inlet ports in the sleeve, the longitudinal spacing between the openings being substantially equal to the longitudinal spacing between their respective inlet ports. Longitudinal piston movement causes the inlet ports to be progressively blocked, the ratio between the effective unblocked portions of the ports remaining substantially constant. A pressure responsive means such as a diaphragm controls the longitudinal piston position so as to vary the effective portions of the inlet ports inversely to the pressure within the sleeve and piston. The variance in pressure drops across the inlet ports due to changes in the flow rate of the inflowing gases is thereby limited without altering the mixing ratio.

In the preferred embodiment the circumferential spacing between the inlet ports is unequal to the circumferential spacing between their respective piston openings, permitting the mixing ratio to be altered by rotating the sleeve about its longitudinal axis.

1 Claim, 6 Drawing Figures

ADJUSTABLE GAS MIXING VALVE

BACKGROUND OF THE INVENTION

Field of the Invention

This invention relates to a gas mixing valve, and more particularly to valves useful in the medical ventilator art.

Gas mixing valves combine a plurality of different gases to produce a gaseous output having desired proportions of each constituent. Such valves are used in medical ventilators to mix air and oxygen into an enriched breathing gas for a patient. In this application it is important, although the mixing ratio may change for different patients or different situations, that once a particular ratio is set it remain relatively constant throughout the operating cycle of the machine. In normal practice, however, it has been found that the mixing accuracy is a function of the pressure differential between the gases entering and leaving the valve. In a typical arrangement the air and oxygen are processed through individual pressure regulators and are each presented to the valve at approximately equal pressures of from 10 to 50 psi, depending upon the application. The gases undergo a pressure drop during transit through the valve, and emerge in a mixed state at a pressure that can be considerably less than the entry pressure. During variations in the gas flow rate accompanying the patient's breathing cycle, the pressure of the gases leaving the regulators and presented to the valve remains substantially constant. The magnitude of the pressure drop through the valve, on the other hand, is highly dependent upon the flow rate, increasing as the flow rate increases and decreasing as the flow rate falls.

Due to tolerances in the accuracy of the pressure regulators, the pressure of the gases presented to the valve are generally unequal and may actually differ by 0.5 psi or so. At high flow rates the pressure differential across the valve is considerably greater than this tolerance differential, and deviations from the desired mixing ratio are relatively minor. At low rates, however, the pressure differential across the valve approaches and may even fall below the tolerance differential. As a result the actual mixing ratio may vary widely from the theoretical ratio, and in the extreme the flow of one of the gases may be shut off entirely. Although many presently available valves exhibit good mixing accuracy under high flow rates, their accuracy deteriorates under the described reduced flow rate conditions.

SUMMARY OF THE INVENTION

The principal object of the present invention is the provision of a novel and improved gas mixing valve that maintains a high mixing accuracy over a wide range of gas flow rates.

Another object is the provision of a novel and improved gas mixing valve having means to compensate for reduced gas flow rates by maintaining the pressure differential across the valve at a level high enough to secure a desired degree of accuracy.

A further object of the present invention is the provision of a novel and improved mixing valve as described above in which the mixing ratio between different gases is readily adjustable without sacrificing mixing accuracy.

In the accomplishment of these and other objects, the present invention provides a gas mixing valve having a mixing chamber, such as a cylindrical sleeve, with at least two gas inlet ports and an outlet port. An adjustable blocking means, such as a hollow cylindrical piston slidably lodged within and adjacent to the interior cylindrical surface of the sleeve, is provided to block the inlet ports and thereby reduce the effective portions thereof available to support gas flow. Openings formed in the blocking means align with the inlet ports when the valve is set for maximum flow. The blocking means is movable away from this setting to shift the openings out of alignment with the inlet ports and thereby restrict their effective portions. The position of the blocking means is governed by a control which functions to vary the effective portions of the inlet ports inversely to the difference between the pressure within the mixing chamber and a reference pressure of greater magnitude than the chamber pressure, thereby limiting the variance in pressure drops across the inlet ports experienced by inflowing gases as the flow rate of the gases varies. The pressure differential across the valve is thereby maintained at a relatively high level, and the valve mixing accuracy is correspondingly improved.

In a preferred embodiment the piston is coupled to a resilient diaphragm forming one wall of a compartment which is kept at substantially the same pressure as the interior of the sleeve and piston. The diaphragm urges the piston to a position of maximum flow when the pressure within the chamber equals a predetermined threshold level, and moves the piston to progressively block the inlet ports as the chamber pressure increases above the threshold. The circumferential spacing between the inlet ports is unequal to the circumferential spacing between their respective piston openings, whereby rotation of the sleeve about its longitudinal axis serves to adjust the ratio between the effective openings of each inlet port and thereby the mixing ratio.

DESCRIPTION OF THE DRAWINGS

Further advantages and features of the invention will be apparent to those skilled in the art from the ensuing detailed description thereof, taken together with the accompanying drawings, in which.

DETAILED DESCRIPTION

Figure 1:
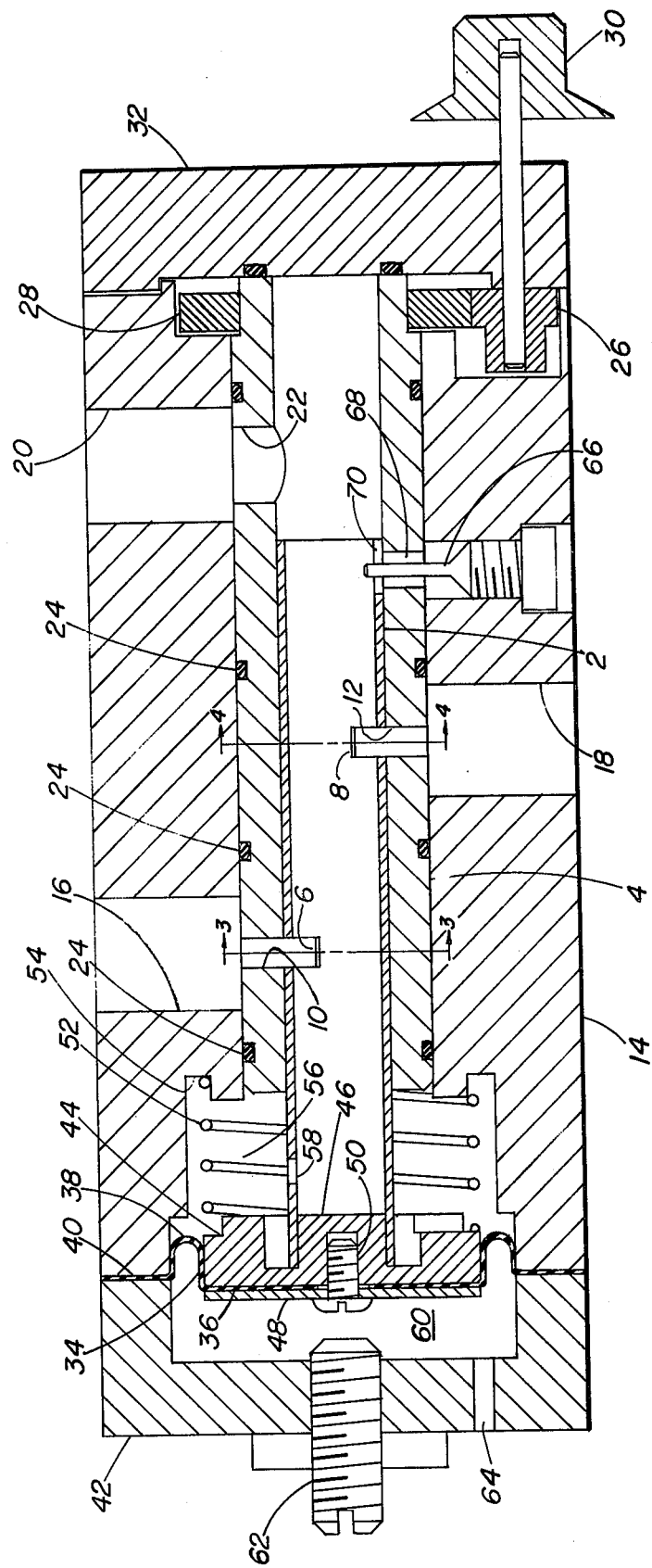
FIG. 1 is a sectional view of a gas mixing valve constructed in accordance with the invention, with the lowermost gas inlet port and piston opening shifted circumferentially for purposes of illustration.
Figure 2:
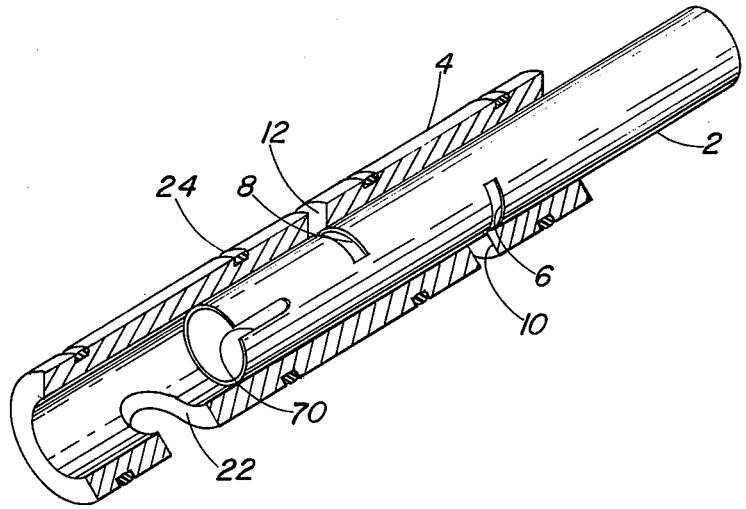
FIG. 2 is a cutaway perspective view of a sleeve and piston which form a mixing chamber in the present invention, shown in an inverted position relative to the vantage of FIG. 1.

A preferred embodiment of the present invention is shown in FIG. 1. A hollow, open-ended, cylindrical piston 2 formed from a suitable material such as aluminum or stainless steel is slidably lodged within a hollow, cylindrical sleeve 4 which forms a chamber for mixing a plurality of gases. The valve inlets and outlet are also shown in FIG. 2. A pair of inlet openings 6 and 8 are formed by notches cut into the cylindrical wall of piston 2, with corresponding notches cut into the cylindrical wall of sleeve 4 to form inlet ports 10 and 12. While only two port-opening pairs are shown in the drawing, as many additional pairs could be added as there are gases to be mixed. Opening 8 is shown in FIG. 1 as diametrically opposed to opening 6 for purposes of illustration. In actuality it may be shifted circumferentially from the position shown, as is brought out in FIGS. 2, 4a, and 4b.

Referring again to FIG. 1, a manifold 14 surrounds sleeve 4 and is provided with portals 16 and 18 which receive tubes for transmitting incoming gases from pressure regulators or the like to ports 10 and 12. An additional manifold portal 20 is aligned with an outlet port 22 in sleeve 4 beyond the open end of piston 2 to provide an exit passage for gases within the valve. A number of O-rings 24 are lodged between manifold 14 and sleeve 4 to permit sealed rotation of the sleeve about its longitudinal axis. A drive gear 26 housed within manifold 14 engages a driven gear 28 on the outer circumference of sleeve 4 for this purpose. Drive gear 26 is controlled by a knob 30 for rotating sleeve 4. A cap 32 is secured over the end of manifold 14 to seal the chamber.

A diaphragm 34 having a flat central portion 36, a flexible, resilient convolution 38 surrounding the central portion, and a flat peripheral flange 40, is positioned over the opposite end of manifold 14 from cap 32 with flange 40 abutting the manifold end wall. A cup-shaped housing member 42 bears against the opposite surface of flange 40 and is secured to manifold 14 to hold the diaphragm firmly in place. Piston 2 is coupled to the central diaphragm portion 36 by a construction which includes a plug 44 positioned against the inner surface of central portion 36, a cylindrical boss 46 on the plug which provides a base for the end of piston 2 to fit over, a plate 48 positioned against the outer surface of central portion 36, and a bolt 50 holding plate 48, central diaphragm portion 36, and plug 44 together. After being slipped over boss 46, piston 2 is attached to plug 44 by brazing or the like. A coil spring 52 is positioned around piston 2 and held between plug 44 and an interior wall 54 of manifold 14 to urge the diaphragm and piston to the left, as seen in FIG. 1.

Diaphragm 34 forms one wall of an inner compartment 56 which is also bounded by manifold 14, plug 44, and piston 2. An opening 58 is formed in the cylindrical wall of piston 2, allowing gas to flow between compartment 56 and the interior of the piston chamber and thereby substantially equalize the pressures therein. A second, outer compartment 60 is formed on the outer side of diaphragm 34 and bounded by the diaphragm, plate 48, and housing member 42. A settable screw 62 is threaded through an opening in housing member 42 in alignment with bolt 50 to provide an adjustable stop against leftward movement of diaphragm 34. An orifice 64 is provided in housing member 42 to permit a reference pressure to be maintained inside compartment 60 from a constant pressure source external to the valve.

Piston 2 can slide longitudinally within sleeve 4 under the constraints of diaphragm 34, spring 52, and stop screw 62. A pin 66 extends from manifold 14 through a partial circumferential opening 68 in sleeve 4 and into a longitudinal slot 70 at the end of piston 2 to prevent the piston from rotating as it moves longitudinally. In the position shown in FIG. 1, piston openings 6 and 8 are fully aligned with inlet ports 10 and 12 and present a minimum resistance to gas flows into the valve. When used in conjunction with a medical ventilator, the output of the pressure regulators for the constituent gases is preferably delivered to compartment 60 through orifice 64 to establish a reference pressure therein, as well as to inlet portals 16 and 18. Piston openings 6 and 8 are in the position shown when the gas flow rates into the valve are at the high end of their range, for example, about 120 liters per minute. As the flow rates into the valve decrease, the aforesaid pressure drops would normally also tend to decrease and thereby reduce the mixing accuracy. However, the decreased flow rates produce a higher absolute pressure within the valve which causes diaphragm 34 to flex and move piston 2 to the left, thereby shifting openings 6 and 8 at least partially out of alignment with inlet ports 10 and 12 and restricting the effective portions of the ports available to support gas flow. The reduced effective inlet port areas tend to increase the pressure drops across the ports, thereby considerably improving the mixing accuracy of the valve at the reduced gas flow rates.

Figure 3A:
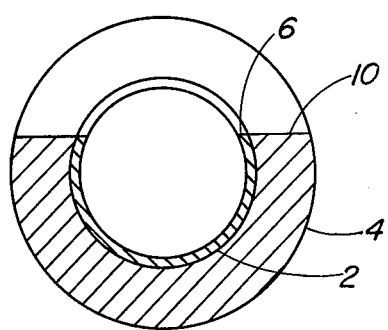
FIGS. 3a and 3b are sectional views taken along the line 3—3 of FIG. 1 at two different valve settings.
Figure 3B:
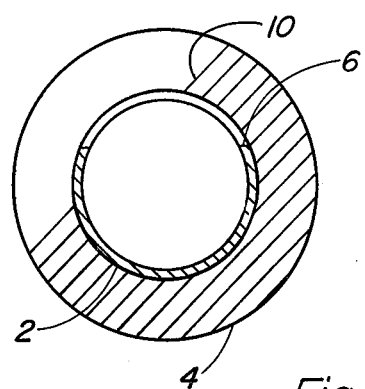
Figure 4A:
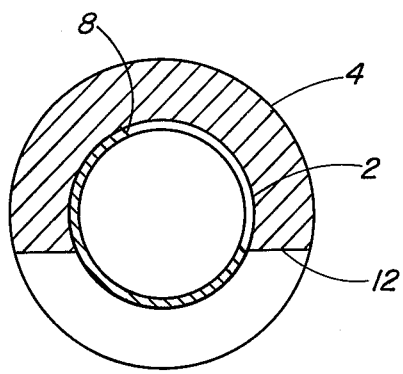
FIGS. 4a and 4b are sectional views taken along the line 4—4 of FIG. 1 at the respective valve settings of FIGS. 3a and 3b.
Figure 4B:
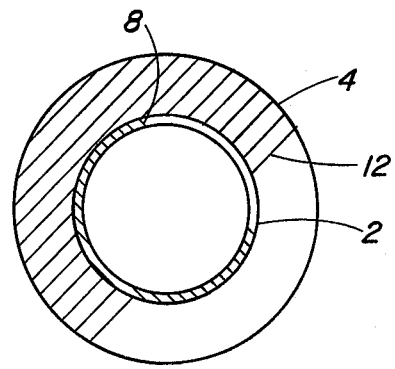

The relative circumferential positions of opening 6 and port 10 and of opening 8 and port 12 for a given rotational position of sleeve 4 are shown respectively in FIGS. 3a and 4a. The notches forming ports 10 and 12 are cut into diametrically opposite sides of sleeve 4, whereas the notch forming opening 6 is cut into piston 2 at an angle approximately 90° to the notch forming opening 8. By thus introducing a circumferential spacing between the sleeve ports that is unequal to the circumferential spacing between the piston openings, the mixing ratio between two input gases can be adjusted by turning gear control knob 26 to rotate sleeve 4. In FIG. 3a sleeve 4 is rotatably positioned such that inlet port 10 is fully aligned with opening 6, at which setting port 12 is completely out of alignment with and blocked by opening 8 (FIG. 4a). In this position the only gas flow into the valve is through port 10. If sleeve 4 is now rotated approximately 45° counterclockwise, moving ports 10 and 12 circumferentially with respect to openings 6 and 8, the result is shown in FIGS. 3b and 4b. Inlet port 10 now has approximately one-third of its area blocked by piston 2, and inlet port 12 has approximately two-thirds of its area blocked. The remainder of each port is aligned with its respective opening 6 or 8, and is therefore effective in transmitting gas into the valve. In the example illustrated in FIGS. 4a and 4b the gas flow volume through inlet port 10 is approximately twice that through inlet port 12. Further counterclockwise rotation of sleeve 4 will continue to reduce the flow through inlet port 10 and increase the flow through inlet port 12. Sleeve 4 can thus be set at any of a range of circumferential positions to produce a desired mixing ratio between incoming gases.

It is important to note that the circumferential adjustment mechanism just described is not analogous to the longitudinal adjustment feature. In the latter feature the longitudinal spacing between inlet ports 10 and 12 is equal to the corresponding spacing between piston openings 6 and 8, and the mixing ratio between the effective unblocked portions of the inlet ports remains substantially constant as piston 2 slides longitudinally back and forth within sleeve 4 to compensate for changes in pressure. Rotary adjustment of sleeve 4, on the other hand, changes the mixing ratio.

While a particular embodiment of the invention has been shown and described, numerous additional modifications and variations are possible in light of the above teachings. It is therefore intended that the scope of the invention be limited only in and by the terms of the appended claims.

What is claimed is:

1. A gas mixing valve for a medical respirator comprising:
   a manifold having at least two gas inlet portals for receiving gases to be mixed and an outlet portal providing exit for gases so mixed;
   a cap attached to and sealing one end of said manifold so as to prevent escape of gas;
   a cup-shaped housing member secured to and sealing another end of said manifold so as to prevent escape of gas;
   a hollow, cylindrical sleeve movably lodged within said manifold and having at least two gas inlet ports formed by notches cut into diametrically opposite sides of said sleeve and also having an outlet port;
   a gear assembly mounted at one end of said sleeve comprising a driven gear attached on the outer circumference of said sleeve engaged by a drive gear housed within said manifold and controlled by a knob attached thereto so as to rotate said sleeve about its longitudinal axis within said manifold;
   sealing means for preventing fluid communication between said sleeve and said manifold along mutual longitudinal dimensions thereof except at said portals and said ports;
   a hollow, open-ended, cylindrical piston slidably lodged within said sleeve having at least two openings formed from notches cut into said piston such that a notch forming a first opening is cut into said piston at an angle approximately perpendicular to a notch forming a second opening, for receiving gases to be mixed from the inlet ports of said sleeve;
   a plug having a cylindrical boss and secured thereby at one end of said piston;
   a diaphragm comprising a flat central portion, a flexible, resilient convolution and a flat peripheral flange, secured between one end of said manifold and said cup-shaped housing member at said flat peripheral flange, said flat central portion being secured to said plug by means of a bolt and a flat plate;
   an inner compartment formed in the wall of said manifold and further bounded by said plug, one side of said diaphragm an end of said sleeve and said piston, said piston having an opening providing fluid communication between said inner compartment and the interior of said piston;
   an outer compartment formed in said cup-shaped housing member and further bounded by the other side of said diaphragm and the flat plate attached to said diaphragm;
   a settable screw threaded into said cup-shaped housing member for adjusting the allowable travel of said diaphragm;
   an orifice in said cup-shaped housing for the introduction of a reference pressure into said outer compartment;
   a pin threaded into said manifold and projecting into a longitudinal slot formed at the open end of said piston through a partial circumferential opening formed in said sleeve; and
   a coil spring located in said inner compartment in compression so as to bear against an interior wall of said manifold and said plug so as to urge said plug and thus said diaphragm into said outer compartment.

* * * * *

UNITED STATES PATENT OFFICE
CERTIFICATE OF CORRECTION

Patent No. 4,085,766          Dated  April 25, 1978

Inventor(s) James Weigl and Leo James Lichte

It is certified that error appears in the above-identified patent and that said Letters Patent are hereby corrected as shown below:

Column 1, Line 41, insert -- flow -- after "low"

Signed and Sealed this

Twenty-second Day of August 1978

[SEAL]

Attest:

RUTH C. MASON
Attesting Officer

DONALD W. BANNER
Commissioner of Patents and Trademarks